United States Patent
Eldar et al.

(10) Patent No.: US 10,552,634 B2
(45) Date of Patent: Feb. 4, 2020

(54) METHOD FOR ALLOWING DATA CLASSIFICATION IN INFLEXIBLE SOFTWARE DEVELOPMENT ENVIRONMENTS

(71) Applicant: Microsoft Israel Research and Development (2002) LTD, Matam Haifa (IL)

(72) Inventors: Yuval Eldar, Shoham (IL); Roee Oz, Tel Aviv (IL)

(73) Assignee: Microsoft Israel Research and Development (2002), Redmond, WA (US)

( * ) Notice: Subject to any disclaimer, the term of this patent is extended or adjusted under 35 U.S.C. 154(b) by 188 days.

(21) Appl. No.: 15/655,694

(22) Filed: Jul. 20, 2017

(65) Prior Publication Data
US 2017/0329992 A1    Nov. 16, 2017

Related U.S. Application Data

(63) Continuation of application No. PCT/IL2016/050065, filed on Jan. 20, 2016.
(Continued)

(51) Int. Cl.
*G06F 21/62* (2013.01)
*G06F 3/0488* (2013.01)
(Continued)

(52) U.S. Cl.
CPC ...... *G06F 21/6245* (2013.01); *G06F 3/04886* (2013.01); *G06F 8/70* (2013.01);
(Continued)

(58) Field of Classification Search
CPC ........ G06F 21/6245; G06F 8/70; G06F 21/16; G06F 21/82; G06F 21/602;
(Continued)

(56) References Cited

U.S. PATENT DOCUMENTS

| | | | |
|---|---|---|---|
| 9,400,660 B1 * | 7/2016 | Krivopaltsev | ...... G06F 3/04842 |
| 2001/0027331 A1 | 10/2001 | Thompson | |

(Continued)

OTHER PUBLICATIONS

Office Action issued in U.S. Appl. No. 14/908,611 dated Oct. 30, 2017.
(Continued)

*Primary Examiner* — Ashokkumar B Patel
*Assistant Examiner* — Quazi Farooqui
(74) *Attorney, Agent, or Firm* — Workman Nydegger

(57) ABSTRACT

Abstract system and method for enabling data modification, classification and enforcement of IRM capabilities in standard isolated software applications is disclosed, according to which an add-on code is installed on the terminal device of user that runs the standard application. The add-on code is adapted to interact with the virtual keyboard used by the standard application, to form a custom virtual keyboard to which the features of classifying data items(s) and/or of modifying the content of the data item are added, without changing the natural environment, the user is normally used to. Then a custom virtual keyboard that includes a designed UP interfacing objects is created, for adding inputs that are associated with classification and modification in the data item in the form of a hidden tag tot the content of the data item.

15 Claims, 9 Drawing Sheets

Related U.S. Application Data

(60) Provisional application No. 62/105,863, filed on Jan. 21, 2015.

(51) Int. Cl.
  *G06F 8/70* (2018.01)
  *G06F 21/16* (2013.01)
  *G06F 21/60* (2013.01)
  *G06F 21/82* (2013.01)
  *G06F 8/61* (2018.01)

(52) U.S. Cl.
  CPC ............ *G06F 21/16* (2013.01); *G06F 21/602* (2013.01); *G06F 21/6218* (2013.01); *G06F 21/82* (2013.01); *G06F 8/61* (2013.01); *G06F 2221/031* (2013.01); *G06F 2221/0737* (2013.01); *G06F 2221/2141* (2013.01)

(58) Field of Classification Search
  CPC ............ G06F 3/04886; G06F 21/6218; G06F 2221/0737; G06F 8/61; G06F 2221/2141; G06F 2221/031; G06F 21/62; G06F 3/0488
  USPC .............................................. 726/1
  See application file for complete search history.

(56) References Cited

U.S. PATENT DOCUMENTS

| | | | |
|---|---|---|---|
| 2003/0132950 A1 | 7/2003 | Surucu et al. | |
| 2008/0168135 A1* | 7/2008 | Redlich | G06Q 10/10 709/204 |
| 2010/0043047 A1 | 2/2010 | Archer et al. | |
| 2010/0146600 A1* | 6/2010 | Eldar | G06F 21/6218 726/5 |
| 2012/0011192 A1 | 1/2012 | Meister et al. | |
| 2012/0023182 A1 | 1/2012 | Puffer et al. | |
| 2012/0030187 A1 | 2/2012 | Marano et al. | |
| 2012/0064875 A1* | 3/2012 | Miller | H04M 1/72522 455/418 |
| 2013/0283195 A1 | 10/2013 | Bilgen et al. | |
| 2013/0304761 A1 | 11/2013 | Redlich et al. | |
| 2014/0267130 A1 | 9/2014 | Hwang et al. | |
| 2014/0282269 A1* | 9/2014 | Strutt | G06F 3/04883 715/863 |
| 2014/0317595 A1* | 10/2014 | Kilby | G06Q 10/06316 717/105 |

OTHER PUBLICATIONS

"Search Report Issued in European Patent Application No. 16739885.8", dated Sep. 7, 2018, 12 Pages.

"Final Office Action Issued in U.S Appl. No. 14/908,611", dated Mar. 5, 2018, 13 Pages.

"International Search Report and Written Opinion Issued in PCT Application No. PCT/IL2016/050065", dated Apr. 17, 2016, 8 Pages.

* cited by examiner

METHOD FOR ALLOWING DATA CLASSIFICATION IN INFLEXIBLE SOFTWARE DEVELOPMENT ENVIRONMENTS

CROSS-REFERENCE TO RELATED APPLICATIONS

This application is a continuation of and claims priority to PCT Application No. PCT/IL2016/050065 filed on Jan. 20, 2016 entitled "Method for Allowing Data Classification in Inflexible Software Development Environments" which claims the benefit of and priority to U.S. Provisional Patent Application Ser. No. 62/105,863 filed on Jan. 21, 2017 and entitled "Method for Allowing Data Classification in Inflexible Software Development Environments," and which applications are expressly incorporated herein by reference in their entirety.

FIELD OF THE INVENTION

The present invention relates to the field of information technology. More particularly, the invention relates to a method for enabling data classification and enforcement of encryption, information rights management (IRM) capabilities, or other enforcement methods in software applications in inflexible (isolated) software development environments.

BACKGROUND OF THE INVENTION

Information Classification is used in many organizations to enforce encryption and other protection methods (like blocking transmissions) on corporate sensitive information from unauthorized access and usage by users. It allows to enforce such protection methods based on business value and confidentiality levels. The proliferation of mobile devices as main enterprise productive tool should supply such capability as in other endpoint devices.

IRM mainly includes enforcement of access and usage rights, in order to determine which user will be able to perform actions on data, such as copy, drag/drop, print, print screen, save as, save and view operations. One of the features of IRM is the ability to classify data items that are generated or consumed by applications.

In many applications for mobile devices, software systems may be in use for a long time and may be modified for new features and added functionalities (such as classification and protection functionalities) demanded by users or organizations. Extensibility of such software systems (a system's ability to have extended new functionality while the system's internal structure and data flow are minimally or not affected) is so becomes very important. Extensibility enables developers to expand or add to the software's capabilities. Some of the approaches include facilities for allowing users' own program routines to be inserted and the abilities to define new data types as well as to define new formatting markup tags. However, there is a difficulty in creating a solution that allows adding capabilities or content adorations to a 3rd party application. This is even more severe in operation systems where applications runs mostly isolated from each other, like iOS (a mobile operating system developed by Apple Inc. and distributed exclusively for Apple hardware) and Android (a mobile operating system based on the Linux kernel), which allow very little methods for one vendor software package to interact with other vendor's software packages or with native (build-in) applications.

Actually, the ability of a standard (third party) application to call other applications and/or process codes is very limited.

One of the existing solutions to this problem is to create a substitute application which includes the ability to classify, modify data items, and protect, in addition to all the inherent capabilities of the standard application. However, is very expensive to develop such a substitute application and in addition, it forces the user to replace his standard application, to which he is used to.

It is therefore an object to provide a method for supporting standard and third party applications and allowing enforcement of classification and protection capabilities by enabling data classification and data items manipulation, which does not interrupt the user's natural workflow.

It is another object to provide a method for enabling data classification and enforcement of encryption and Information Rights Management (IRM) capabilities in software applications, which will be generic for all standard applications.

Other objects and advantages will become apparent as the description proceeds.

SUMMARY OF THE INVENTION

A method for enabling data modification, classification and enforcement of IRM capabilities in standard isolated software applications is disclosed, according to which an add-on code is installed on the terminal device of a user that runs the standard application. The add-on code is adapted to interact with the virtual keyboard used by the standard application, to form a custom virtual keyboard to which the features of classifying data item(s) and/or of modifying the content of the data item are added, without changing the natural environment, the user is normally used to. Then a custom virtual keyboard that includes a designed UI interfacing objects is created, for adding inputs that are associated with classification and modification in the data item in the form of a hidden tag to the content of the data item.

Upon consuming the classified or modified data item by the standard application, the method may further include seeking the hidden tag and making a decision regarding further processing of the data item, according to a predetermined protection policy. A dedicated code may also be embedded into the inherent code of the virtual keyboard, for tracking the characters that the user inputs and detecting keywords or strings of the typed data item that are indicative that the content of the data item should be classified.

Data items for which no hidden tag is found may be rebounded back to the sender along with a request for classification. The data item may be automatically encrypted, in response to its classification.

The interfacing objects may be virtual buttons, checkboxes and icons for providing inputs that are associated with classification and modification in the data item.

Modifications in the content of the data item may include adding a disclaimer, adding invisible marking tagging characters/objects, content marking, watermarking or hidden signatures.

The hidden tag may be a character having a transparent font of a very small font presented at the bottom of the message body.

The protection policy may include blocking one or more operations that can be made with the classified data item.

A method for enabling data modification, classification and enforcement of IRM capabilities in standard isolated software applications is disclosed, comprising the following steps:

a) installing a client application on the terminal device of a user that runs the standard application, the client application is adapted to interact with a Push Notification service;
b) enforcing classification of data items externally of the terminal device by using the existing Push Notification service;
c) upon creating and forwarding a data item to another instance for further processing, issuing a push notification via the Push Notification service to the user that forwarded the data item, while simultaneously, activate the client application to display an interface to the user, via which the user is able to classify the sent data item;
d) sending the selected classification by the client application, to the notification service infrastructure; and
e) forwarding the created data item to its destination or otherwise, holding the data item that was sent by the user in confinement, until receiving the classification result.

A method for enabling data modification, classification and enforcement of IRM capabilities in standard isolated software applications is disclosed, comprising the following steps:
a) installing an add-on code on the terminal device of a user that runs the standard application, the add-on code is adapted to:
  a.1) provide a navigation feedback to the user on behalf of an installed standard application;
  a.2) communicate with the user on the application's behalf when a user's finger is hovering over input area of the screen.

In one aspect, an accessibility button hovering over input areas on screen may be shown, while allowing the user clicking the accessibility button using a UI which allows the user to select an appropriate classification for his composed content and adding visible or hidden markings to the composed content, based on his selection.

In another aspect, a security product (such as a CASB, a DLP or a mail server policy) may be used to enforce a desired security policy by allowing a secured data item to reach its destination only after said security product runs a security policy (e.g., encryption, tagging or blocking operations) based on the classification made.

DETAILED DESCRIPTION OF PREFERRED EMBODIMENTS

Figure 1:
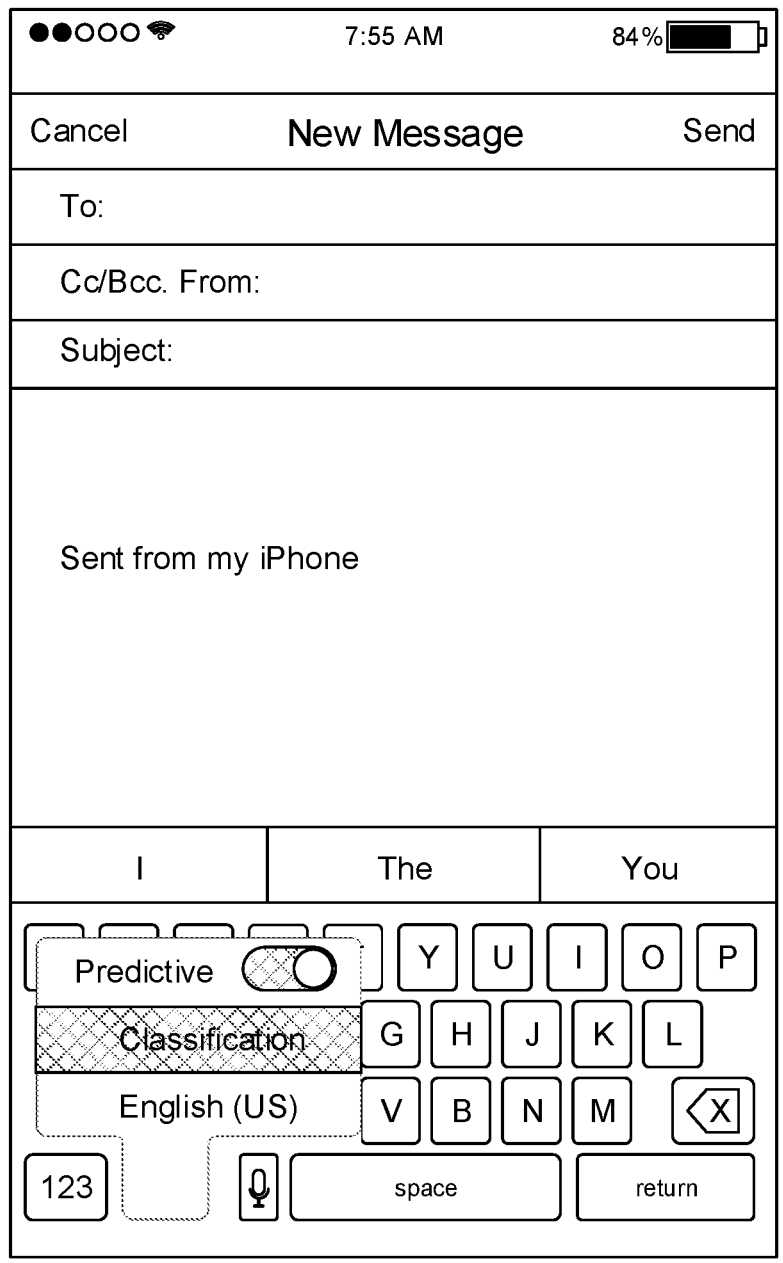
FIG. 1 illustrates an example of using a virtual keyboard within the application.

The proposed method for enabling data classification and enforcement of encryption and Information Rights Management (IRM) capabilities in software applications in inflexible (isolated) software development environments includes two maim embodiments:

Example 1.1

Using the Virtual Keyboard within the Application

In this embodiment, a virtual keyboard is used to provide input data to the standard application in order to allow classification and modification of data items that are generated by the user and used by the application (taking the advantage that adding a designed custom keyboard is the most commonly available item that the operating environment allows) and thereby, establishing a generic interaction with the standard application. This of course, does not require any intervention in the code of the standard application, since the keyboard service is provided by the operating system rather than by the application. This allows adding a custom keyboard which is available for any application which uses the OS keyboard services for any application that requires a keyboard for interaction with the user. Since operation systems like iOS and Android have the capability to allow the user to select a desired keyboard or to modify an existing keyboard to match his needs, is used this inherent capability to allow the user to classify data by creating a custom virtual keyboard and adding the features of classifying data items and/or of modifying the content of the data item into this keyboard. This allows the user to classify or mark his data, without changing the natural environment, the user is normally used to. The custom virtual keyboard may include interfacing objects, such as virtual buttons, checkboxes and icons for providing inputs that are associated with classification and modification in the data item. This feature allows software developers to create a desired custom keyboard with enriched dedicated interface with the desired additional functionality. For example, it is possible to add classification buttons to the virtual keyboard, such as "secret", "top secret", "private", "public" etc. It is also possible to make desired modifications in the content of the data item, such as adding a disclaimer, invisible marking tagging characters/objects, content marking, watermarking, hidden signatures etc., by sending any input desired from the custom keyboard into the application content. This also allows defining a specific classification mode as a default mode of the custom keyboard, which may (or may not) be changed by the user, depending on the classification policy.

The custom keyboard allows creating a designed UI that will send input into the input field the user is typing into, thereby allowing modifying the content according to the buttons the user clicked on in the custom keyboard (examples of custom keyboards and the system supporting custom keyboard include iOS and Android devices, are described for example in: https://developer.apple.com/library/ios/documentation/General/Conceptual/Extensibility PG/Keyboard.html; or in http://code.tutsplus.corahutorials/create-a-custom-keyboard-on-android—cms-22615)

According to one embodiment, it is possible to embed a dedicated code into the inherent code of the virtual keyboard, which will track the characters that the user inputs, in order to detect keywords or other strings of the typed data item that may be indicative that the content of the data item should be classified.

One way to carry out the classification of the data item is by adding a hidden tag to the content. For example, in case of an edited email message, a hidden signature associated with a "secret" class may be added to the text of the message. Standardly, the hidden tag may be a character having a transparent font or a very small font that will be presented at the bottom of the message body, such that it will not draw the user's attention and will be practically hidden.

After the user completes editing the message, he sends it and once the email reaches the email infrastructure system (which is the first point out of the mobile device that sends the message and may be for example, a mail server, a proxy an Mail Transfer Agent (MTA—software that transfers electronic mail messages from one computer to another using a client—server application architecture) or the like, the email system intercepts the message, seeks the hidden tag and makes a decision regarding further processing of the intercepted message, as a part of a protection policy. For example, the email system may enforce a set of predetermined protection rules, such as blocking one or more operations (for example, printing, saving, copying etc.). Similar protection schemes may also be applied to transfer of the data item to storage services, such as "DROPBOX" or storage clouds.

If the email system does not find a hidden tag, it may rebound the message back to the sender along with a notification that he must classify the message before sending it.

According to another embodiment, the custom virtual keyboard code may be adapted to read a configuration file that comprises the classification policy rules to be enforced. According to this example, if the user types confidential data such as his ID or his social security number into the message body, the configuration file (which comprises the protection policy management rules) may instruct the custom keyboard code to present a notification to the user that the data item he is currently editing must be classified as "secret". In this case, the content of the data item may be automatically encrypted, before it will be consumed or accessed by further parties.

FIG. 1 illustrates an example of using a virtual keyboard within the application. In this case, the user composes an email message and the virtual keyboard used to type is modified to include an extra tab with a classification button. The user should press the classification button before he sends the message.

Figure 2:
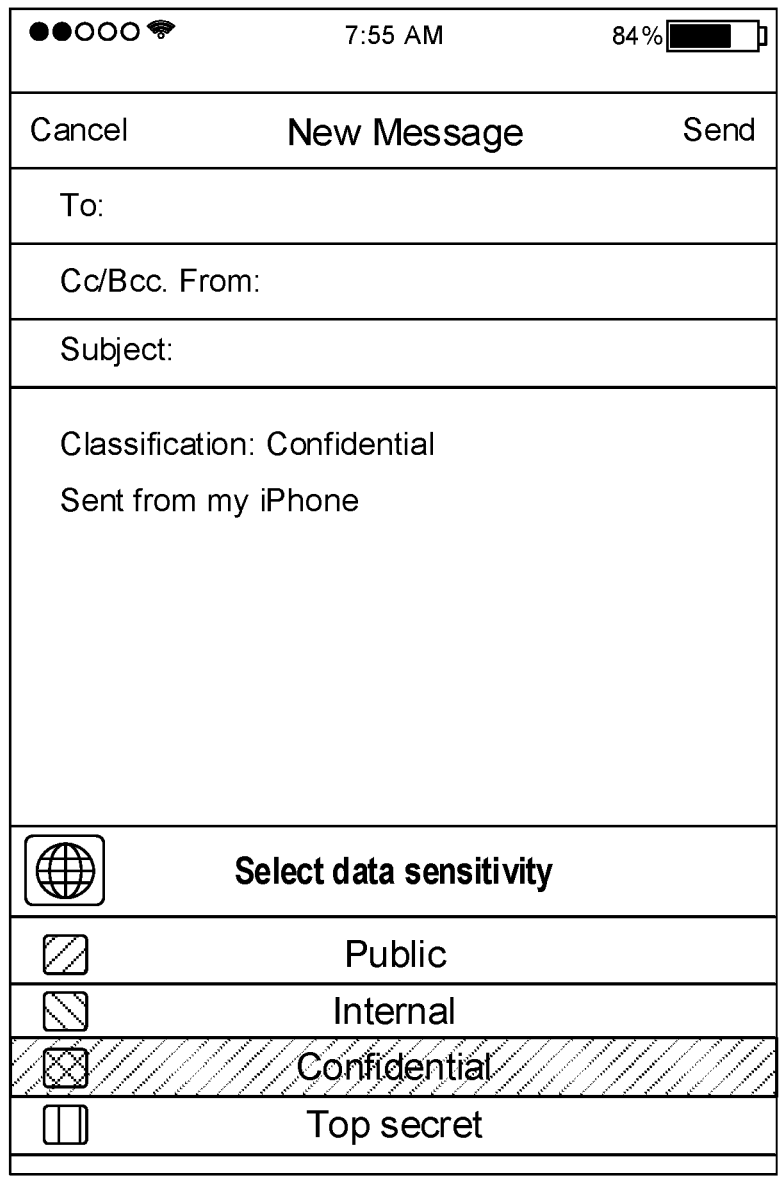
FIG. 2 illustrates an example of using a virtual keyboard as of FIG. 1, with visible markup.

FIG. 2 illustrates an example of using a virtual keyboard as of FIG. 1, but with visible markup that allows selecting a desired classification level (in this case, "Confidential"), which is shown on the content field.

Alternatively, a user may click a button provided by registering an accessibility service (rather than presenting a classification UI to the user by changing the virtual keyboard). From this point, the shown UI and the UI action, like insert visible/hidden markings, is the same. This Alternative is described in Example 1.2 below.

Example 1.2

Using an Accessibility Service

Accessibility services are a feature of the Android framework designed to provide alternative navigation feedback to the user on behalf of applications installed on Android devices. An accessibility service can communicate with the user on the application's behalf, such as converting text to speech, or haptic feedback when a user's finger is hovering on an important area of the screen. A technical description as to how to create an accessibility service, process information received from the application, and report that information back to the user are disclosed for example, in http://developer.android.com/training/accessibility/service.html.

In this example, an accessibility service is used, for example, on Android devices, in order to provide a classification interface to user. This can be done, for example, by showing a "bubble", or a "button" hovering over input areas on screen. By clicking this accessibility "button", the same interface described in the Example 1.1 above will be shown to the user. This includes showing a UI that allows the user to pick an appropriate classification for the content he is composing, and adding visible or hidden markings to the composed content, based on his selection.

Figure 3:
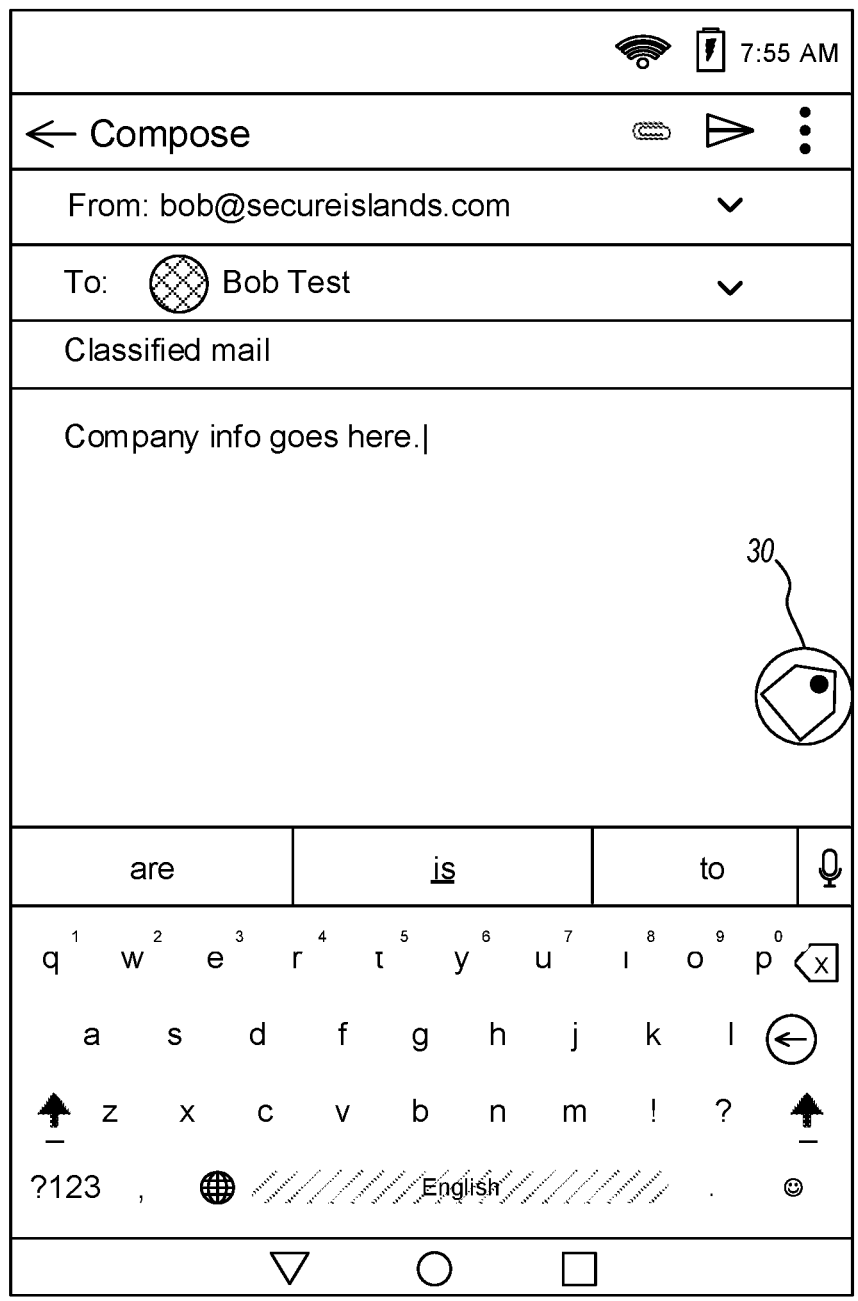
FIGS. 3-5 illustrate an example of using an Accessibility Service, as an alternative to a classification modified virtual keyboard.
Figure 4:
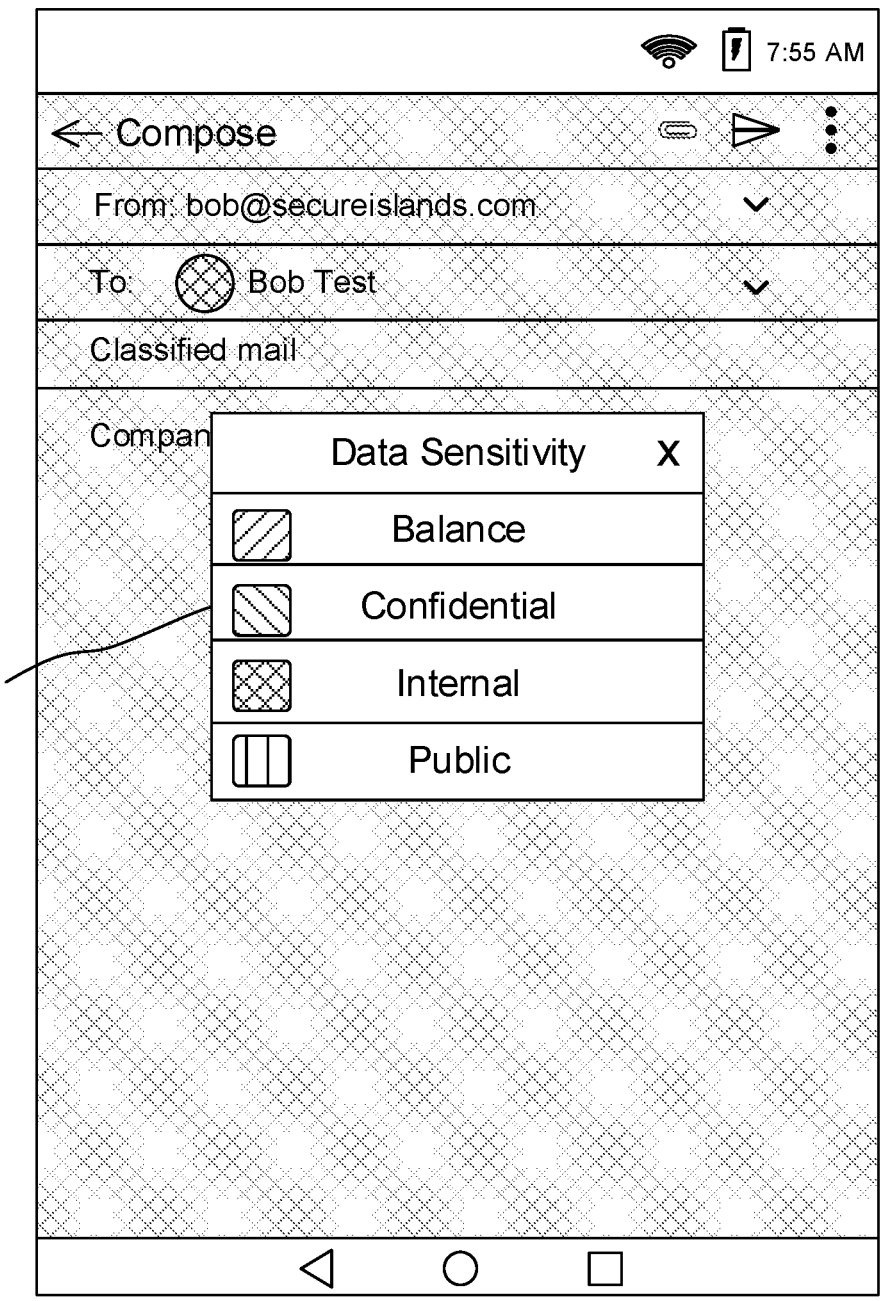
Figure 5:
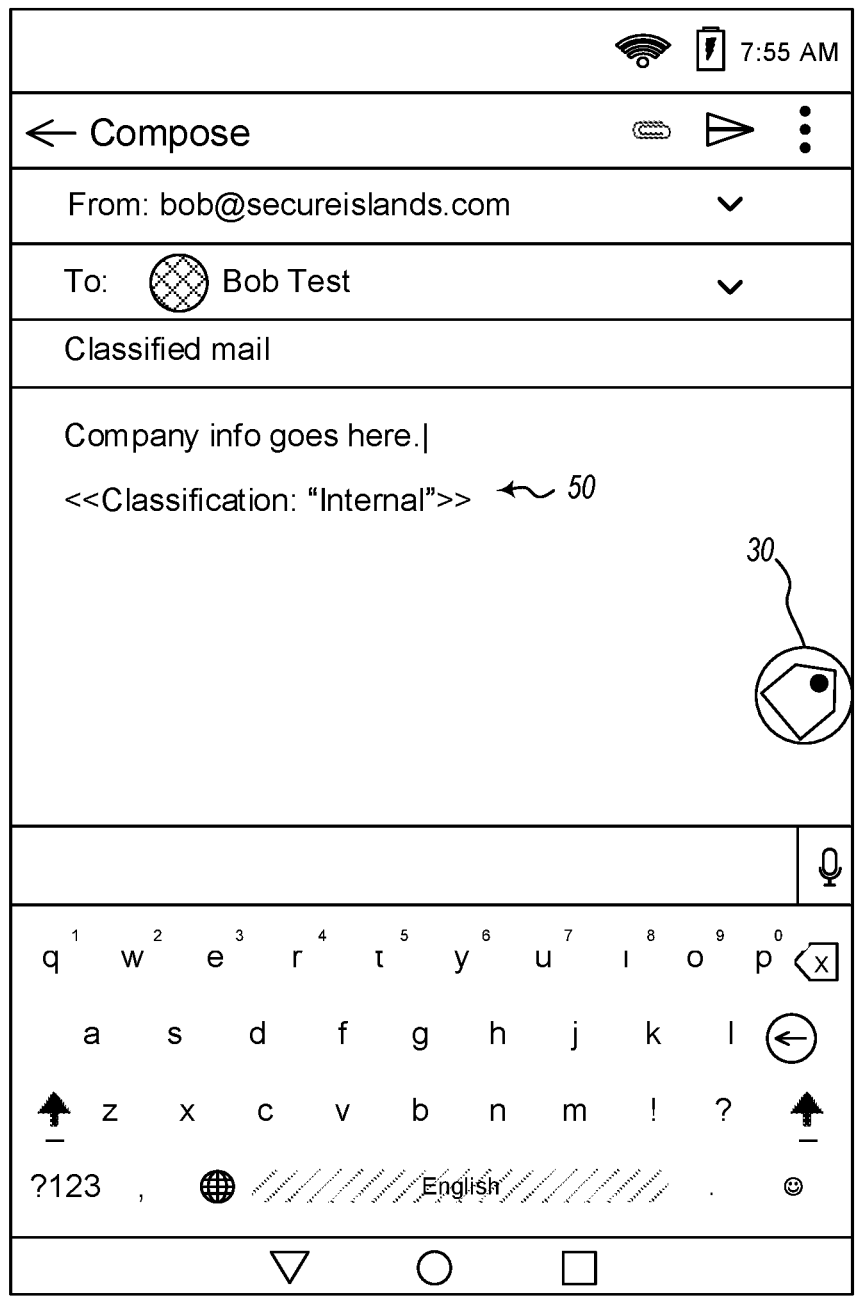

FIGS. 3-5 illustrate an example of using an Accessibility Service. In this example, the accessibility service introduces a floating button 30 over the textual area in a 3rd-party application, as shown in FIG. 3. Upon clicking floating button 30, the Accessibility Service opens a classification UI 40, shown in FIG. 4.

FIG. 5 illustrates an example of using an Accessibility Service where upon selecting a desired classification, the Accessibility Service adds visible marking 50 of the selected classification level into the text field (in this example, "Internal").

Figure 6:
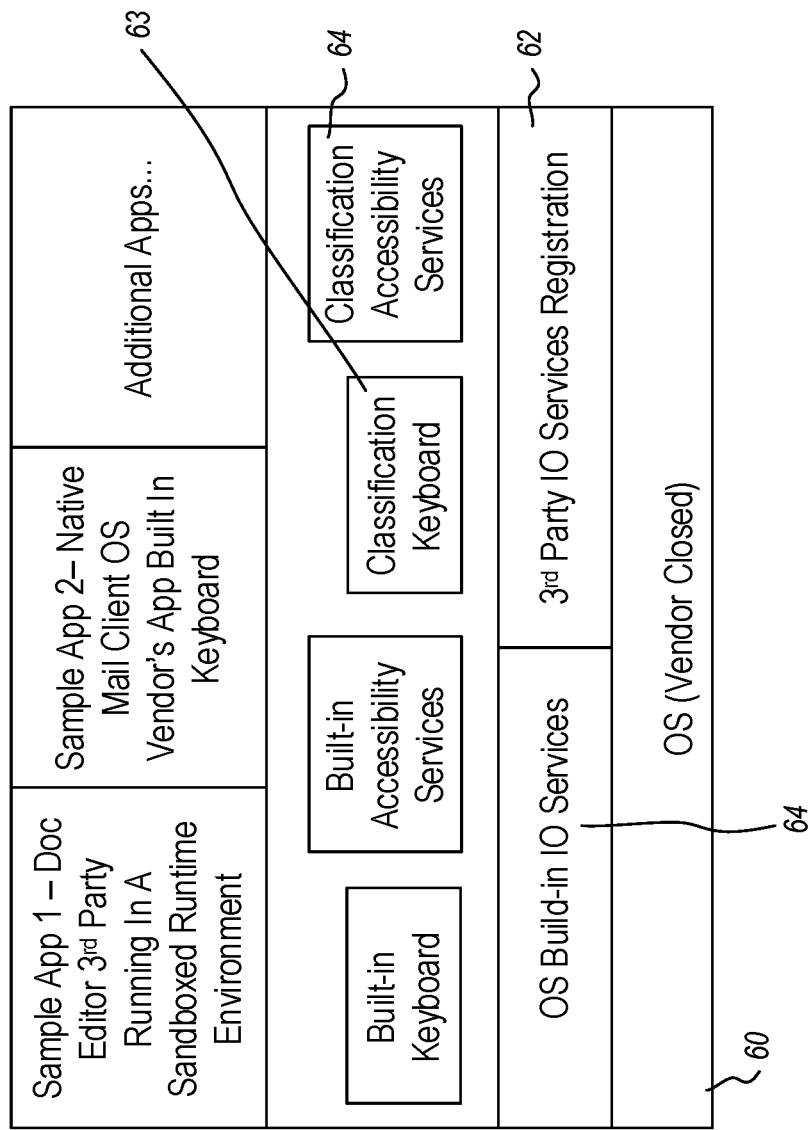
FIG. 6 illustrates a mobile device architecture which uses the proposed classification tools.

FIG. 6 illustrates a mobile device architecture which uses the classification tools proposed according to an embodiment. The OS provided by the vendor is a closed environment (such as Apple's iOS). The device has built-in I/O services 61 that are part of the device's OS, as well as 3rd party I/O services 62, provided from external sources. The device can run several applications such as a 3rd party document editor that runs using application sandboxing (that limits the environments in which its code can execute) or a Vendor's native mail client application. Classification tools are provided using the built-in keyboard to create a classification keyboard and the built-in accessibility services to create a classification accessibility service 64.

Figure 7:
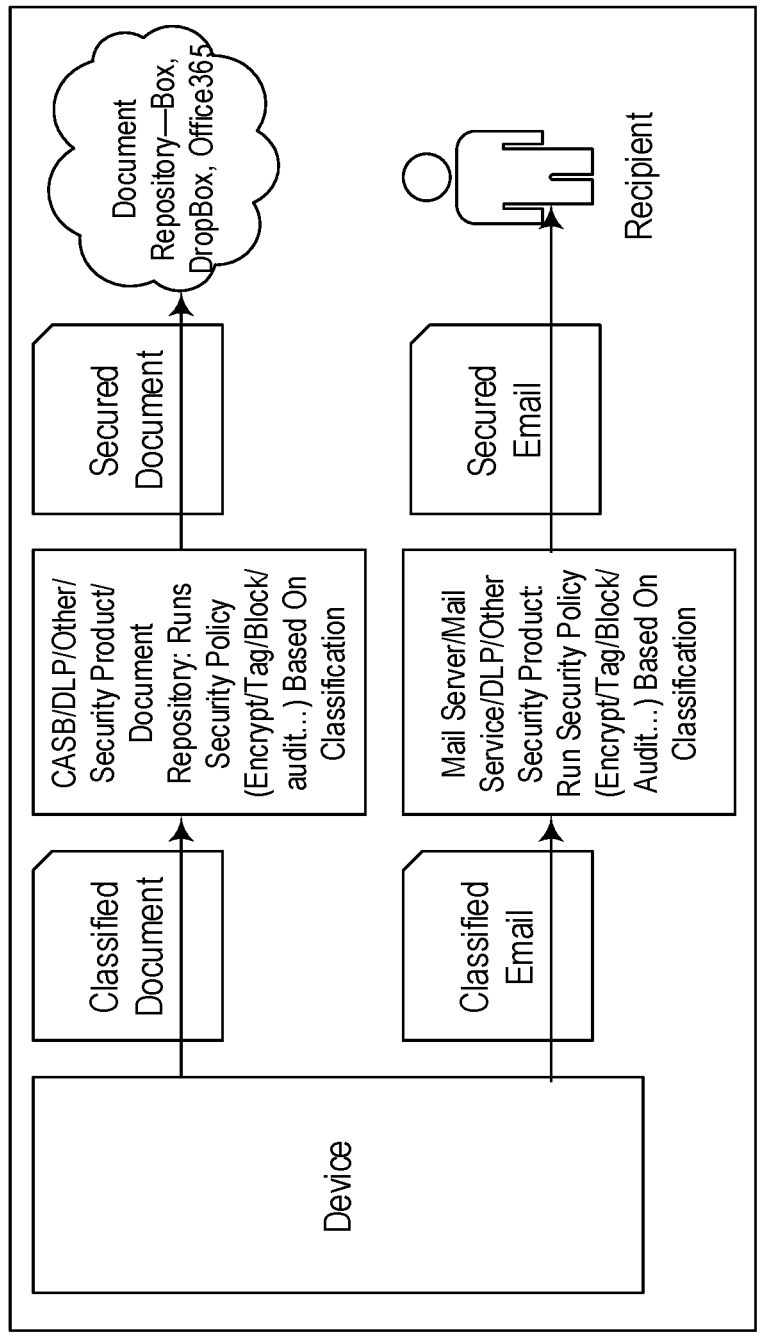
FIG. 7 illustrates an architecture of providing security enforcement, using 3rd party security products to enforce a desired security policy.

FIG. 7 illustrates an architecture of providing security enforcement, using 3rd party security products to enforce a desired security policy. These products may include a Cloud Access Security Broker (CASB—a software tool or service that sits between an organization's on-premises infrastructure and a cloud provider's infrastructure. A CASB acts as a gatekeeper, allowing the organization to extend the reach of their security policies beyond their own infrastructure), a Data Loss Prevention module (DLP—for making sure that end users do not send sensitive or critical information outside the corporate network), or mail server policies. According to the proposed architecture, after a data item is created and classified, the classified item reaches a security product, which runs security policy (which may include encryption tagging, blocking etc.), based on the classification and only then, a secured data item (such as a secured document or email) reaches its destination.

Example 2

Using a Push Notification Service

In this embodiment, no hidden tag is needed. According to this alternate embodiment (that uses an additional method), classification of data items may be enforced externally of the mobile device by using the existing Push Notification service, such as the Apple Push Notification (APN) service (a service created by Apple Inc. that forwards notifications of third party applications to Apple devices via a Notification Center). Here instead of (or in addition to) a virtual keyboard, a backbone service is used to either intercept the user data item or to interact with the service API, usually when the content leaves the mobile device. The backbone service then can ask the user for input (i.e., to classify the data item), and either act on the data item itself or use the backbone service API to take relevant actions (e.g., to classify, to add IRM, to add encryption, to put the data item in confinement, to provide alerts, etc.). Using a Push Notification service is relevant to Dropbox/Google drive/Salesforce and of course, to emails.

The infrastructure that provides the push service is normally used to push a notification to the user of a device, such as a popup message "you have a new mail" whenever the mail server receives a new message that is destined to the user. Accordingly, upon creating and sending a new message, this existing notification service may be used by the mail server to push a notification to the user "you have created a new mail—please classify it". Simultaneously, the APN service will activate a client application (installed in advance on the user's mobile device) that will display an interface to the user (which may include buttons of icons for different classes), via which he will be able to classify the sent email. The client application will send the selected classification to the notification service infrastructure and only then, the created message will be forwarded to its destination. Until receiving the classification result by the mail server side, the email message that was sent by the user will be held in confinement.

Here again, the classification feature is added without any need for intervention in the standard application (in this example, the mail application). The entire process will be conducted by the mail server side, which will use the notification service infrastructure in combination with the client application. This process can be completed sufficiently fast to avoid any substantial delay, since generally the existing notification service infrastructure performs very fast.

Figure 8:
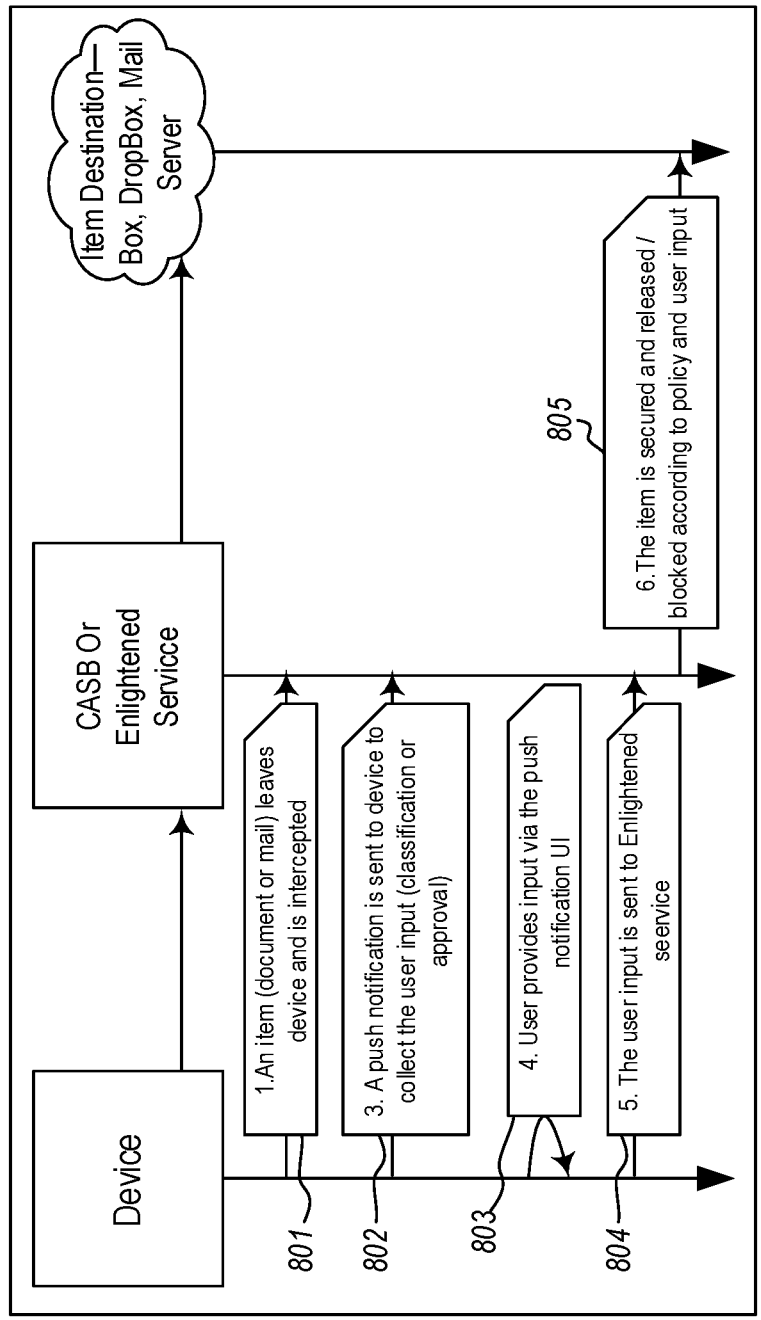
FIG. 8 illustrates a flowchart of using a notification service for classification and user approval.

FIG. 8 illustrates a flowchart of using a notification service for classification and user approval. The device creates a data item (such as a document or an email) and tries forwarding it to a destination. At the first step 801, upon leaving the device, the data item is intercepted by a security module (such as a CASB service). At the next step 802, the security module sends a push notification to the device to collect the user's approval or classification. At the next step 803, the user provides his input via a push notification UI presented to him. At the next step 804, the user's input is sent to the security module. At the next step 805, the data item is secured and forwarded to its destination or blocked from reaching its destination, according to the security policy and the user's input.

The method proposed according to an embodiment does not require a-priori knowledge on the standard application. There is no need to have the standard application source code, and no change is done to the application binary code, interfaces or user experience. Moreover, the proposed solution may be implemented for standard users on standard devices, without the need for any administrator access.

Figure 9:
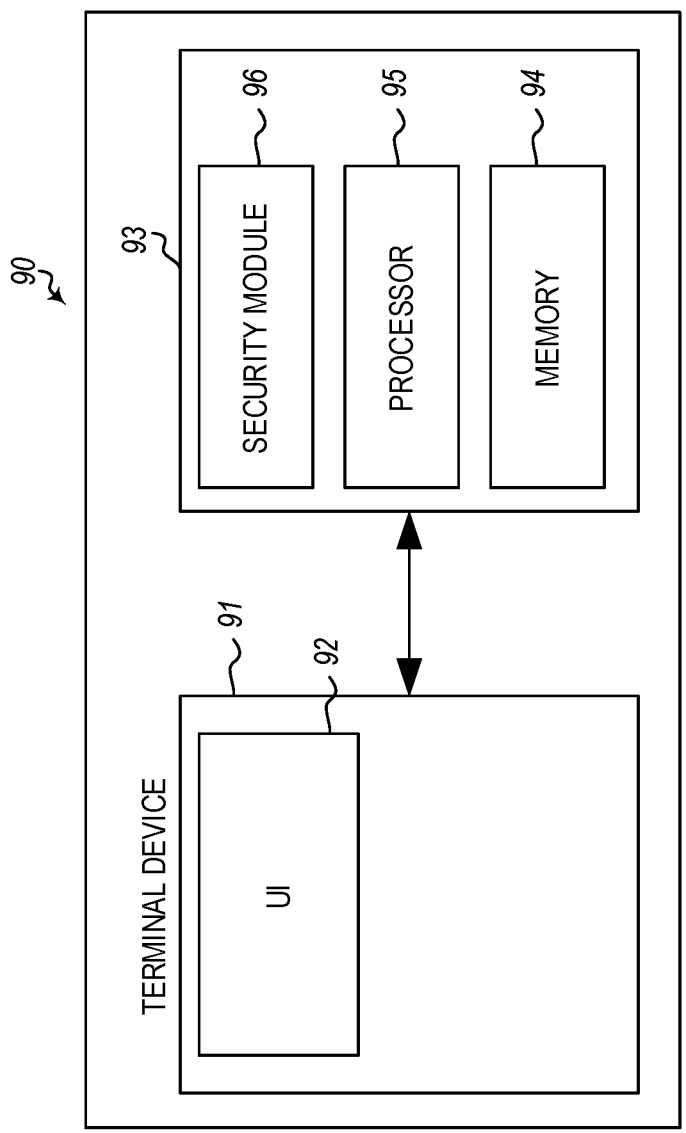
FIG. 9 illustrates a system for enabling data modification, classification and enforcement of IRM capabilities in standard isolated software applications.

FIG. 9 illustrates a system for enabling data modification, classification and enforcement of IRM capabilities in standard isolated software applications. The system 90 comprises a user's terminal device 91 that runs a standard application, on which an add-on code is installed. The add-on code is adapted to interact with the virtual keyboard used by said standard application, to form a custom virtual keyboard, to which the features of classifying data item(s) and/or of modifying the content of said data item are added, without changing the natural environment, the user is normally used to.

A designed UI 92 displays a custom virtual keyboard, which includes interfacing objects, for classifying the data item, according to inputs that are added by the user, which are associated with classification and modification in the data item in the form of a hidden tag that is added to the content of said data item.

The system 90 includes a computerized device 93 including a memory 94 and processor 95, which runs a security module 96, for seeking the hidden tag and making a decision regarding further processing of said data item, according to a predetermined protection policy. For example, converting the data item into a secured data item, before it is consumed by a user or destination (e.g., an email or a document).

The security module may include a dedicated code which tracks the characters that the user inputs and detect keywords or strings of the typed data item that are indicative that the content of the data item should be classified. Data items for which no hidden tag is found are rebounded back to the sender, along with a request for classification.

While some embodiments have been described by way of illustration, it will be apparent that these embodiments can be carried out with many modifications, variations and adaptations, and with the use of numerous equivalents or alternative solutions that are within the scope of persons skilled in the art, without exceeding the scope of the claims

What is claimed is:

1. A method for enabling data modification, classification and enforcement of information rights management (IRM) capabilities in standard isolated software applications, comprising:
    a) installing an add-on code on a terminal device of a user that runs said standard application, said add-on code is adapted to interact with a virtual keyboard used by said standard application, to form a custom virtual keyboard to which the features of classifying data item(s) and/or of modifying the content of said data item are added, without changing the natural environment, the user is normally used to; and
    b) creating the custom virtual keyboard that includes a designed user interface (UI) interfacing objects, for adding inputs that are associated with classification and modification in said data item in the form of a hidden tag to the content of said data item, wherein modifications in the content of the data item include adding a disclaimer, adding invisible marking tagging characters/objects, content marking, watermarking, or hidden signatures.

2. A method according to claim 1, further comprising upon consuming the classified or modified data item by the standard application, seeking said hidden tag and making a decision regarding further processing of said data item, according to a predetermined protection policy.

3. A method according to claim 1, further comprising embedding a dedicated code into the inherent code of the virtual keyboard, for tracking the characters that the user inputs and detecting keywords or strings of the typed data item that are indicative that the content of the data item should be classified.

4. A method according to claim 1, further comprising rebounding data items for which no hidden tag is found back to the sender, along with a request for classification.

5. A method according to claim 1, further comprising automatically encrypting the data item, in response to its classification.

6. A method according to claim 1, wherein the interfacing objects are virtual buttons, checkboxes and icons for providing inputs that are associated with classification and modification in the data item.

7. A method according to claim 1, wherein the hidden tag is a character having a transparent font of a very small font presented at the bottom of the message body.

8. A method according to claim 1, wherein the protection policy includes blocking one or more operations that can be made with the classified data item.

9. A method according to claim 1, further comprising:
a) showing an accessibility button hovering over input areas on screen;
b) allowing the user clicking said accessibility button using a UI which allows said user to select an appropriate classification for his composed content and adding visible or hidden markings to the composed content, based on his selection.

10. A method according to claim 1, wherein a security product is used to enforce a desired security policy by allowing a secured data item to reach its destination only after said security product runs a security policy, based on the classification made.

11. A method according to claim 10, wherein the security product is selected from the group of:
a Cloud Access Security Broker (CASB);
a Data Loss Prevention module (DLP);
a mail server policy.

12. A method according to claim 10, wherein the security policy includes encryption, tagging or blocking operations.

13. A system for enabling data modification, classification and enforcement of information rights management (IRM) capabilities in standard isolated software applications, comprising:
a) a user's terminal device that runs said standard application, on which an add-on code is installed, said add-on code is adapted to interact with the virtual keyboard used by said standard application, to form a custom virtual keyboard to which the features of classifying data item(s) and/or of modifying the content of said data item are added, without changing the natural environment, the user is normally used to; and
b) a designed user interface (UI) for displaying a custom virtual keyboard including interfacing objects, for classifying said data item by allowing said user adding inputs that are associated with classification and modification in said data item in the form of a hidden tag that is added to the content of said data item, wherein modifications in the data item include adding a disclaimer, adding invisible marking tagging characters/objects, content marking, watermarking, or hidden signatures; and
c) a computerized device running a security module, for seeking the hidden tag and making a decision regarding further processing of said data item, according to a predetermined protection policy.

14. A system according to claim 13, in which further processing of the data item includes converting said data item into a secured data item, before being consumed by a user or destination.

15. A system according to claim 13, in which the security module includes a dedicated code adapted to:
a) track the characters that the user inputs and detect keywords or strings of the typed data item that are indicative that the content of the data item should be classified;
b) rebound data items for which no hidden tag is found back to the sender, along with a request for classification.

* * * * *